(12) United States Patent
Kusakabe et al.

(10) Patent No.: US 8,571,988 B2
(45) Date of Patent: Oct. 29, 2013

(54) ELECTRONIC MONEY SYSTEM, ELECTRONIC MONEY TERMINAL DEVICE, AND INFORMATION CARD

(75) Inventors: Susumu Kusakabe, Kanagawa (JP); Hiroshi Abe, Tokyo (JP); Shinako Matsuyama, Tokyo (JP); Fumio Kubono, Tokyo (JP)

(73) Assignee: Sony Corporation, Tokyo (JP)

( * ) Notice: Subject to any disclaimer, the term of this patent is extended or adjusted under 35 U.S.C. 154(b) by 85 days.

(21) Appl. No.: 12/026,950

(22) Filed: Feb. 6, 2008

(65) Prior Publication Data

US 2008/0290156 A1 Nov. 27, 2008

Related U.S. Application Data

(63) Continuation of application No. 09/512,425, filed on Feb. 24, 2000, now Pat. No. 7,366,699.

(30) Foreign Application Priority Data

Mar. 5, 1999 (JP) .................................... 11-059430

(51) Int. Cl.
*G06Q 40/00* (2012.01)

(52) U.S. Cl.
USPC ................ 705/43; 705/41; 705/44; 705/65; 707/657; 235/492; 235/379; 235/381; 714/6.23

(58) Field of Classification Search
USPC .......... 235/492, 379, 381; 705/41, 39, 65, 43, 705/44; 707/657; 714/6.23
See application file for complete search history.

(56) References Cited

U.S. PATENT DOCUMENTS

| | | | | |
|---|---|---|---|---|
| 4,839,504 A | * | 6/1989 | Nakano | 235/379 |
| 5,557,516 A | * | 9/1996 | Hogan | 705/41 |
| 5,770,844 A | * | 6/1998 | Henn | 235/380 |
| 5,773,804 A | * | 6/1998 | Baik | 235/379 |
| 6,003,767 A | * | 12/1999 | Hayashida | 235/380 |
| 6,029,887 A | * | 2/2000 | Furuhashi et al. | 235/379 |
| 6,032,857 A | * | 3/2000 | Kitagawa et al. | 235/379 |
| 6,101,497 A | * | 8/2000 | Ofek | 707/657 |
| 6,129,274 A | * | 10/2000 | Suzuki | 235/381 |
| 6,138,907 A | * | 10/2000 | Mori et al. | 235/379 |

FOREIGN PATENT DOCUMENTS

| | | |
|---|---|---|
| JP | 62-075768 | 4/1987 |
| JP | 09-062708 | 3/1997 |
| JP | 10-154192 | 6/1998 |
| JP | 07-175901 | 7/1998 |
| JP | 10-269288 | 10/1998 |
| JP | 10-307885 | 11/1998 |

* cited by examiner

*Primary Examiner* — Harish T Dass
(74) *Attorney, Agent, or Firm* — K&L Gates LLP

(57) ABSTRACT

An electronic money system includes a plurality of electronic money terminals for withdrawing a sum of money which is spent by a user from money data which has been deposited into an information card. Utilization-history data including the number of times the information card has been utilized, and accumulated in the information card is read out at the time when data relating to the spent money is also withdrawn from the information card. Utilization-history data read out from each of the electronic money terminals are gathered and coordinated, so as to coordinate and tabulate the utilization-histories of the information card which has been utilized on any of the plurality electronic money terminals.

13 Claims, 17 Drawing Sheets

| | CONTENTS | byte |
|---|---|---|
| 1 | Card Transaction S/N (A) | 32byte |
| 2 | Log Type | |
| 3 | (Reserved) | |
| 4 | Data/Time | |
| 5 | Terminal Number | |
| 6 | Dealing Value (unsigned) | |
| 7 | Card Transaction S/N (B) | |
| 8 | Signature1 Key Version | |
| 9 | Balance Data | |
| 10 | Terminal Transaction S/N | |
| 11 | (Reserved) | |
| 12 | Signature1 | |

| | | byte |
|---|---|---|
| 13 | Card IDm | 16byte |
| 14 | Terminal Transaction Flag | |
| 15 | (Reserved) | |
| 16 | Signature2 Key Version | |
| 17 | Signature2 | |

D23A₁ → 13, D23A₂ → 14, D23A₃ → 16, D23A₄ → 17

D23A

FIG. 14B

ELECTRONIC MONEY SYSTEM, ELECTRONIC MONEY TERMINAL DEVICE, AND INFORMATION CARD

CROSS REFERENCES TO RELATED APPLICATIONS

This patent application is a continuation of U.S. application Ser. No. 09/512,425 filed on Feb. 24, 2000 which claims priority to Japanese Patent Application P11-059430 filed in the Japan Patent Office on Mar. 5, 1999, the entire contents of which being incorporated herein by reference.

BACKGROUND

This invention relates to an electronic money system, an electronic money terminal device and an information card, and is applicable to an electronic money system, an electronic terminal device and an information card which are used in such a manner that money data is stored in the information card.

Heretofore, when the user uses a cash card and/or a credit card which are issued by a bank, a credit company and others, clerk working for a store which equips a card terminal device for receiving these cards makes the card terminal device read the card number which has been stored in the magnetic stripe of the card, and also inputs a sum of money which is to be paid at this time.

At this time, the card terminal device connects a communication line to the management computer of the bank or the credit company, and transmits information of the card number, the sum of money utilized, and others. The management computer of the bank or the credit company manages whether each user's cash card or credit card is in a past-due state or not, whether it has reached the limit of utilizable money or not, whether there is a report of loss of the card, etc., and on the basis of the information of the card number, the sum of money utilized which has been sent from the card terminal device via the communication line, the management computer judges whether the use of the card should be allowed or not. When the card is judged to be usable, the management computer of the bank or the credit company returns the use allowance information of the card to the card terminal device of the origin of the transmission, and performs withdrawing process of the utilized sum of money from the specified account of the card.

By the way, in such a system that uses a cash card or a credit card, it is needed to transmit an approval request for using the card to the management computer of the bank or the credit company from the card terminal device whether the user intends to use the card, and there has been a problem in that the process of using a card is complicated because the connection processing of the communication line is needed.

SUMMARY

In view of the foregoing, an object of this invention is to provide an electronic money system, an electronic money terminal device and, an information card wherein a card which substitutes money can be used more surely and effectively.

The foregoing object and other objects of the invention have been achieved by the provision of an electronic money system, an electronic money terminal device and an information card. The utilization-history data, which is accumulated in the information card and which indicates the plural times of utilization, is read at the time when the sum of money which is to be paid by the user is withdrawn from the information card, and the respective utilization-history data which indicates the plural times of utilization and which have been read out by the respective ones of the plural electronic money terminal means are gathered in electronic money management means. By this, the identical utilization-histories are gathered in the electronic money management means in an overlapping manner; therefore, even though one of the identical utilization-histories has been lost, the other one of the utilization-histories can substitute the lost one. So, it is able to perform the tabulation surely.

The nature, principle and utility of the invention will become more apparent from the following detailed description when read in conjunction with the accompanying drawings in which like parts are designated by like reference numerals or characters.

Additional features and advantages are described herein, and will be apparent from the following Detailed Description and the figures.

BRIEF DESCRIPTION OF THE FIGURES

FIGS. 14A and 14B are schematic diagrams showing the structure of the electronic money log data;

DETAILED DESCRIPTION

Preferred embodiments of this invention will be described with reference to the accompanying drawings:

(1) Configuration of the Electronic Money System

Figure 1:
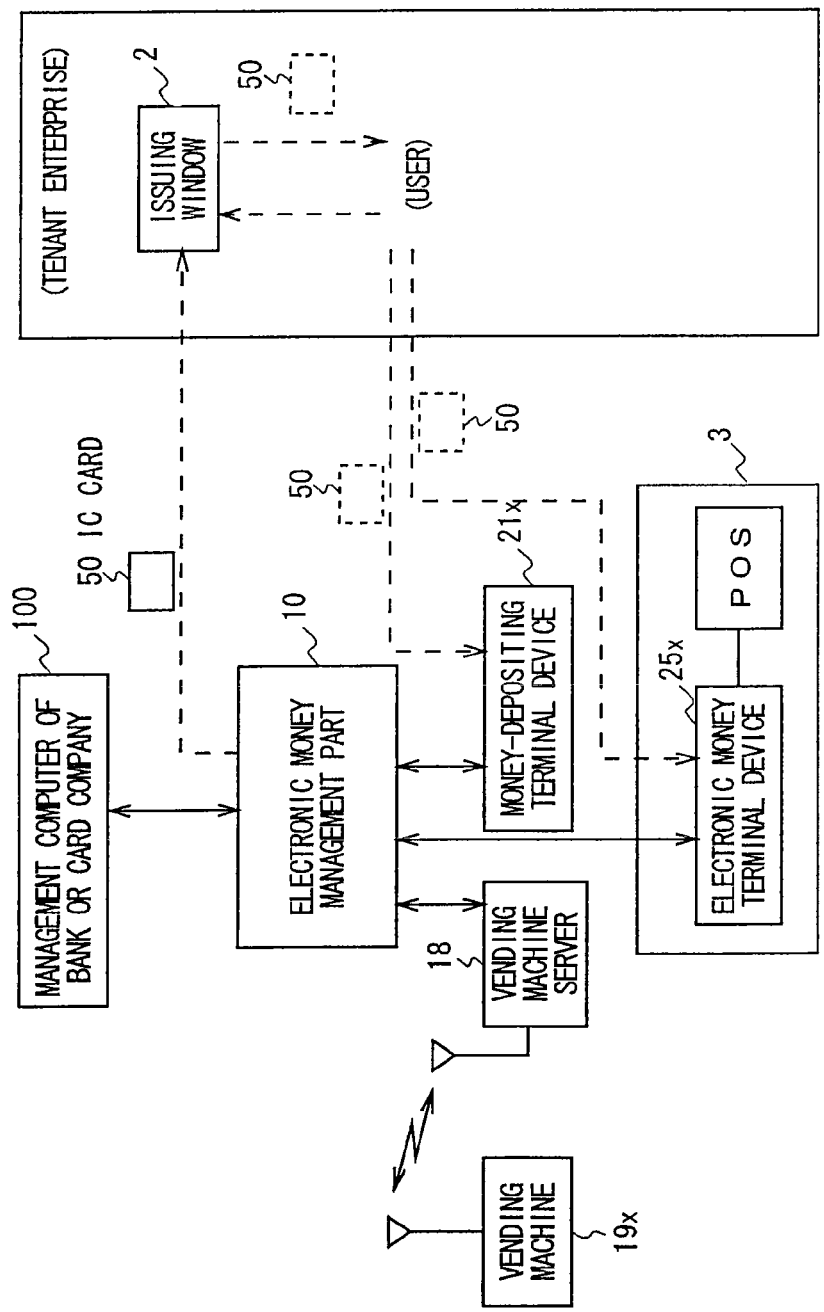
FIG. 1 is a block diagram showing the general configuration of an electronic money system according to the present invention.

Referring to FIG. 1, an electronic money system generally designated as 1 includes: an electronic money management part 10 for issuing IC cards 50, for managing electronic money, and for performing settlement of the accounts; a money-depositing terminals device 21*x* for depositing electronic money (money data) into the IC card 50; an electronic money terminal device 25*x* of each store 3 for receiving a user's payment which is performed by means of an IC card 50 in which electronic money has been deposited; a vending machine 19*x* by which a user is able to buy goods using an IC card 50; and a vending machine server 18 for receiving the utilization history (utilized sum of money, date and time, and others) of the IC card 50 from the vending machine 19*x* and for accumulating this information. In this connection, plural money-depositing terminal devices 21*x*, plural electronic money terminal device 25*x*, and plural vending machines 19 are placed.

Figure 2:
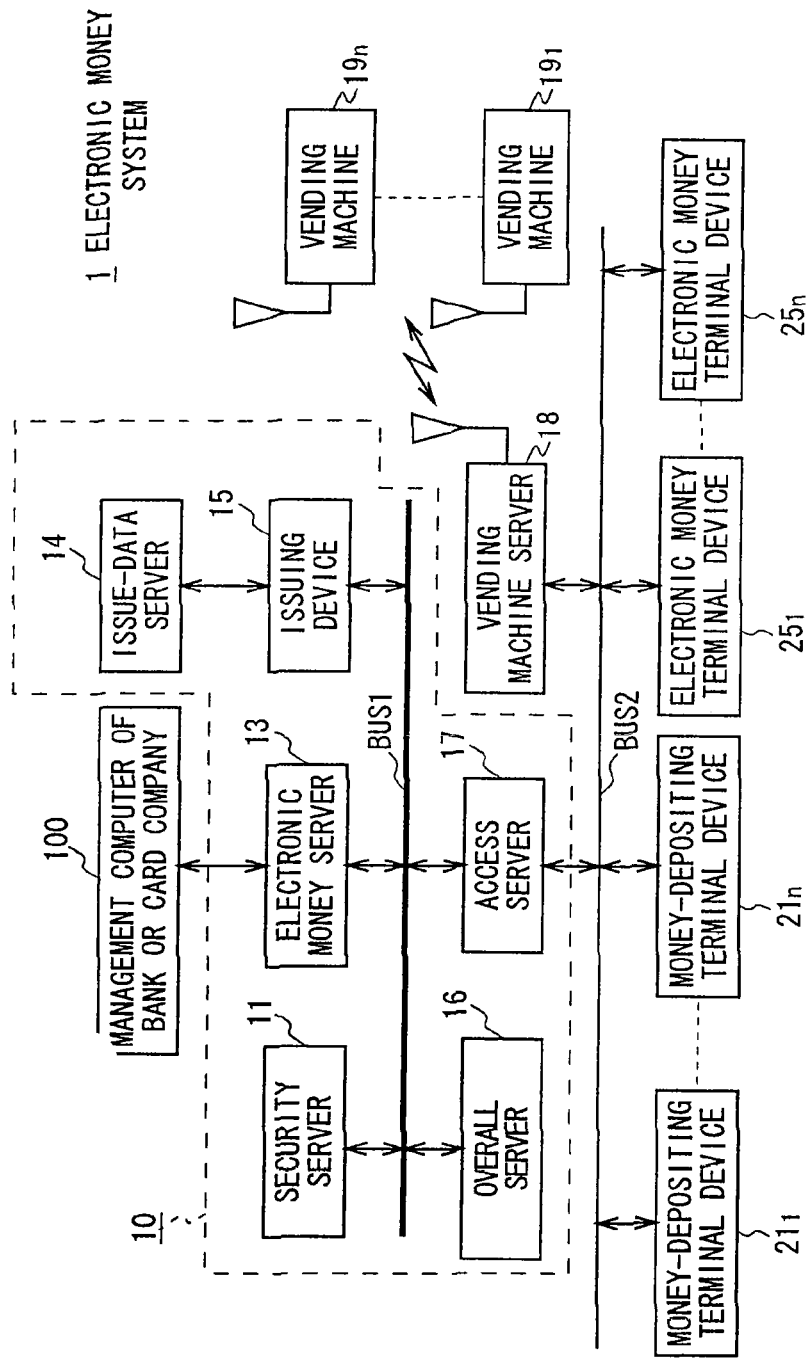
FIG. 2 is a block diagram showing the configuration of the electronic money management part.

In the electronic money management part 10, as shown in FIG. 2, the various kinds of servers (a security server 11, an electronic money server 13, an issue data server 14, an issuing device 15, an overall server 16, an access server 17 and a vending machine server 18) are connected to a data bus BUS1 which forms the Local Area Network (LAN), while the various kinds of terminal devices (money-depositing terminal devices 21*l* to 21*n*, electronic money terminal devices 25*l* to 25*n*, and vending machines 19*l* to 19*n*) are connected to a data bus BUS2 which forms the second LAN. The first LAN and the second LAN are connected to each other via the access server 17.

Figure 3:
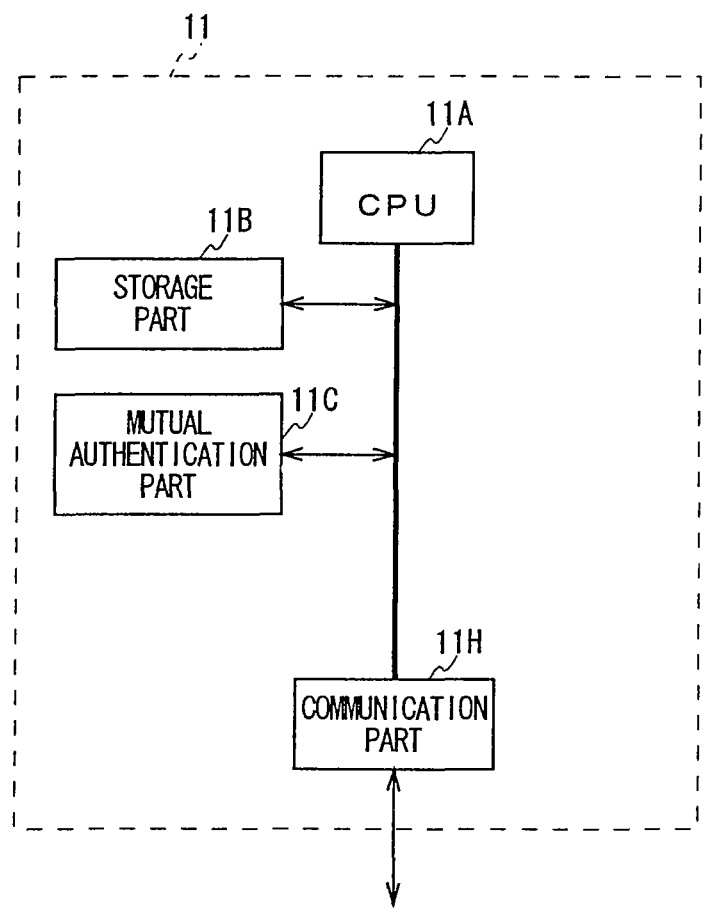
FIG. 3 is a block diagram showing the configuration of the security server.

In the electronic money management part 10, as shown in FIG. 3, the security server 11 includes a CPU 11A which operates in accordance with an operation program stored in a storage part 11B; in sending/receiving of data between the overall server 16 and the other terminal devices or servers, the CPU 11A captures the sent/received data via a communication part 11H, and performs encipherment which employs the stated encipherment key, authentication processing of where to make communication by means of a mutual authentication part 11C, and others.

Figure 4:
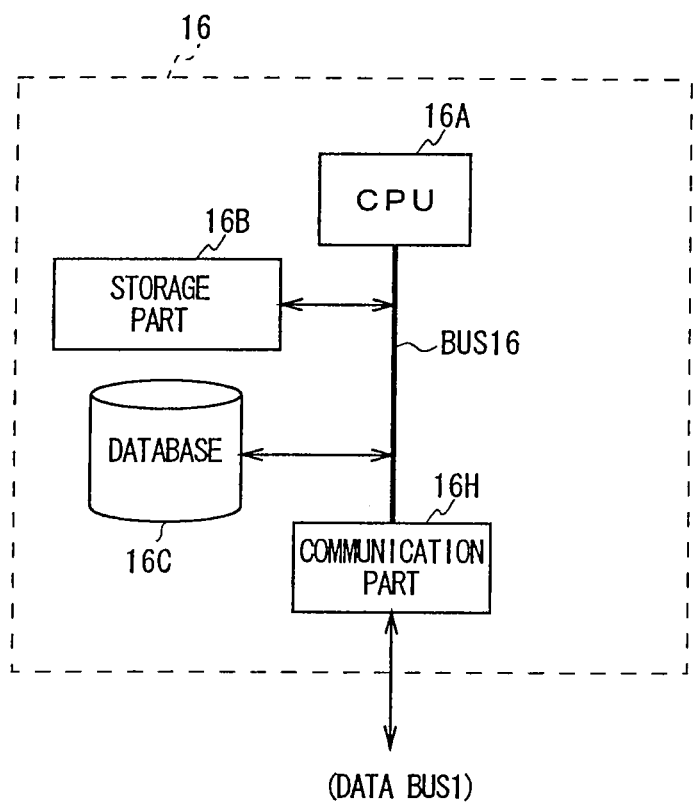
FIG. 4 is a block diagram showing the configuration of the overall server.

As shown in FIG. 4, the overall server 16 includes a CPU 16A which operates in accordance with an operation program stored in a storage part 16B, and captures dealings-history information such as money data which have been deposited via the respective money-depositing terminal devices 21*l* to 21*n* and utilization-history of the IC card 50 (such as the IC card number, the utilized money, the date and time) which have been accumulated in the respective electronic money terminal devices 25*l* to 25*n* from a communication part 16H via, for instance, the second LAN, the access server 17, the first LAN and the security server 11, and then stores them in a database 16C via a data bus BUS16.

Besides, the overall server 16 stores data of money withdrawn from the user's specified account in the database 16C via the electronic money server 13, the withdrawn money data are supplied from a management computer 100 of a bank or a credit company.

The electronic money server 13 performs sending/receiving of data between the management computers 100 of a bank and/or a credit company, and also performs settlement of the accounts on the basis of the various information related to electronic money which has been stored in the database 16C of the overall server 16, at the rate of one time per month as an example.

The issue server 14 registers the combination of the IC card number of an IC card 50 which has been issued at the issuing device 15 and the credit card number of the user who has the IC card 50 into a database.

Besides, the vending machine server 18 accumulates the utilization history (such as the utilized money and the date and time) of the IC card 50 which has been transmitted from the respective vending machines 19*l* to 19*n*, and stores this into the database 16C of the overall server 16, via the second LAN, the access server 17, the first LAN and the security server 11, at the rate of one time per day as an example.

In this electronic money system 1, the issuing device 15 of the electronic money management part 10 issues an Integrated Circuit (IC) card 50 which is adapted to writing or reading of information without any contact, and distributes this to a user at the issuing window 2 of each tenant enterprise (FIG. 1). The IC card 50 has a memory; the one IC card number is previously stored in the memory, for each IC card.

Figure 5:
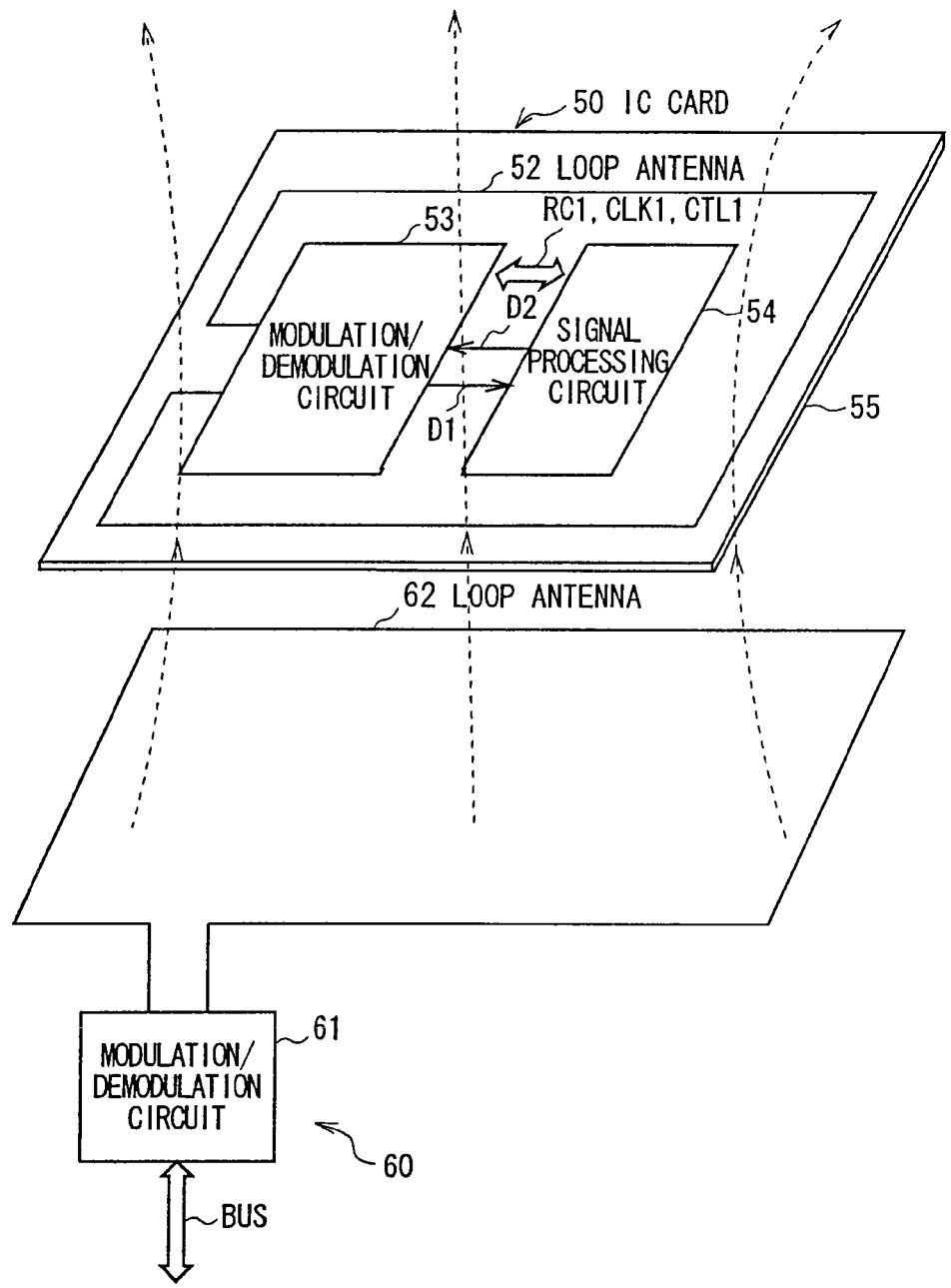
FIG. 5 is a schematic perspective view showing the configuration of the information card.
Figure 6:
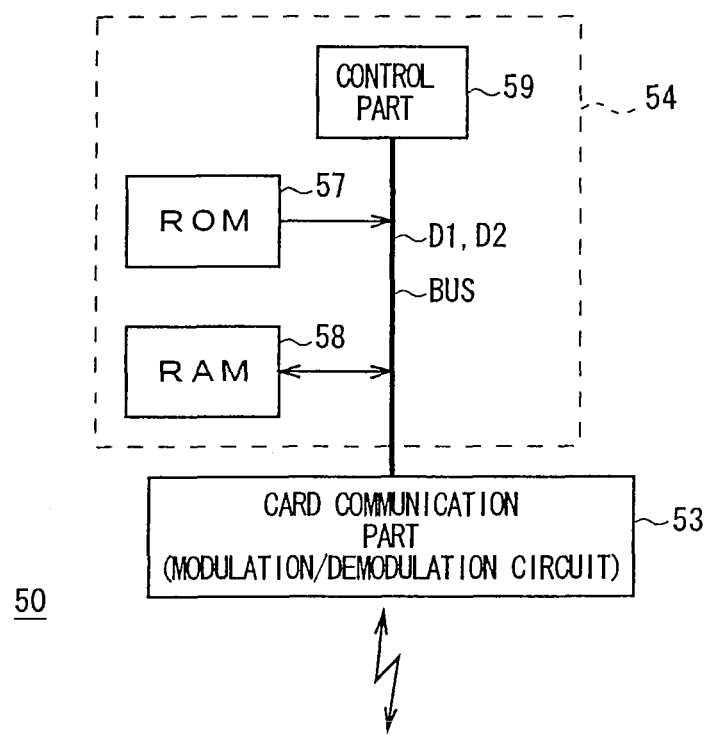
FIG. 6 is a block diagram showing the configuration of the information card.

That is, as shown in FIG. 5, the IC card 50 is a battery-less type IC card which do not have a battery for power supplying, and includes, on a base such as a planar substrate 55, a coil-form loop antenna 52 for receiving the electromagnetic wave which has been radiated from a data write/read device 60 and converts to the electric signal, a modulation/demodulation circuit 53 for performing modulation of the transmission data or demodulation of the reception data, and a control part 54 for performing analyzing of the reception data and generation of the transmission data.

In this IC card 50, the electromagnetic wave which has been radiated from a data write/read device 60 is received by the loop antenna 52, and this wave is sent to the modulation/demodulation circuit 53 as the modulated wave. The modulation/demodulation circuit 53 demodulates the modulated wave, and then supplies this wave to the signal processing circuit 54 as the transmission data D1 which has been sent from the data write/read device 60.

The signal processing circuit 54 includes a control part 59 which is comprised of a hard-logic circuit or a Central Processing Unit (CPU), and a memory part which is comprised of a Read Only Memory (ROM) 57 and a Random Access Memory (RAM) 58; the control part 59 analyzes the transmission data D1, on the RAM 58, in accordance with a program which has been written into the ROM 57, and then, on the basis of the analyzed transmission data D1, reads the various data D2 related to the electronic money which is stored in the RAM 58, and sends this to the modulation/demodulation circuit 53. The modulation/demodulation circuit 53 modulates the data D2, and then radiates the data toward the data write/read device 60 as an electro-magnetic wave.

The modulation/demodulation circuit 53, including a power-supply circuit for converting the energy of electromagnetic wave into a stabilized direct-current power source, generates the direct-current power source DC1 by means of the power supply circuit on the basis of the electromagnetic wave which has been radiated from the data write/read device 60 and received with the loop antenna 52 and supplies it to the control part 59, and also supplies a clock signal CLK1 which has been generated on the basis of the received electromagnetic wave to the control part 54, and, besides, receives a control signal CTL1 which is utilized for the various kinds of controlling from the control part 54.

The data write/read device 60 inputs the various transmission data which have been supplied via a data bus BUS to the modulation/demodulation circuit 61; the modulation/demodulation circuit 61 modulates a carrier wave of the stated frequency band which can be effectively radiated as an electromagnetic wave with this transmission data, so as to radiate it from the loop antenna 62 in a form of electromagnetic wave.

Besides, the data write/read device 60 receives the electromagnetic wave which has been radiated from the IC card 50 with the loop antenna 62, and then supplies this wave to the modulation/demodulation circuit 61 as the modulated wave.

The modulation/demodulation circuit 61 demodulates the modulated wave, and then supplies this signal to a signal processing part (not shown), via the data bus BUS, as the data which has been transmitted from the IC card 50.

Figure 7A:
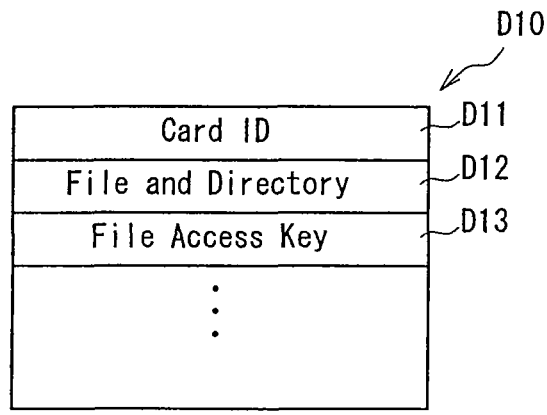
FIGS. 7A and 7B are schematic diagrams showing data which are written in the information card.
Figure 7B:
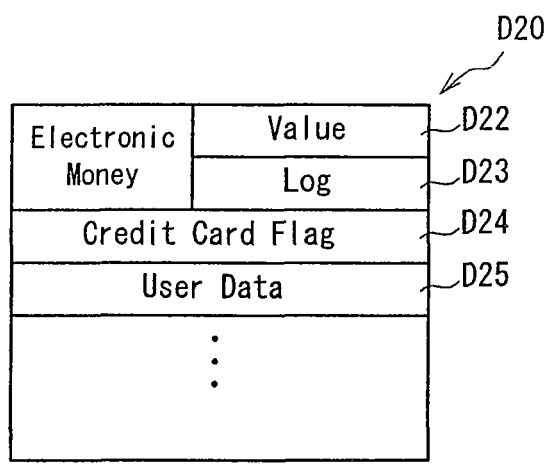

The RAM 58 of the IC card 50 is adapted to storing various kinds of information which is related to electronic money; the information is stored in plural files which are managed by means of a directory. That is, management information D10 which is the high order information of the directory and which is comprised of the IC card number D11, the definition information D12 of the file and the directory, the access key D13 to the file, and others is stored in the RAM 58 of the IC card 50 as shown in FIG. 7A, as well as electronic money information D20 which is the low order information of the directory structure, as shown in FIG. 7B. As the electronic money information D20, the balance data D22 which represents the balance of the electronic money, the electronic money log data D23 which represents the utilization history of electronic money, the credit card utilization flag D24 (described hereinafter) which is previously registered at the time of distribution of the IC card 50, and the other information D25 related to the user (the staff number and/or the entering/leaving data) are written in the respective files; the credit card utilization flag D24 represents whether the shortage can be paid as the utilized moneys of the credit card or not when the balance account data D22 is less than the moneys which is to be paid by the user at the time of payment by the use of the IC card 50.

Figure 8:
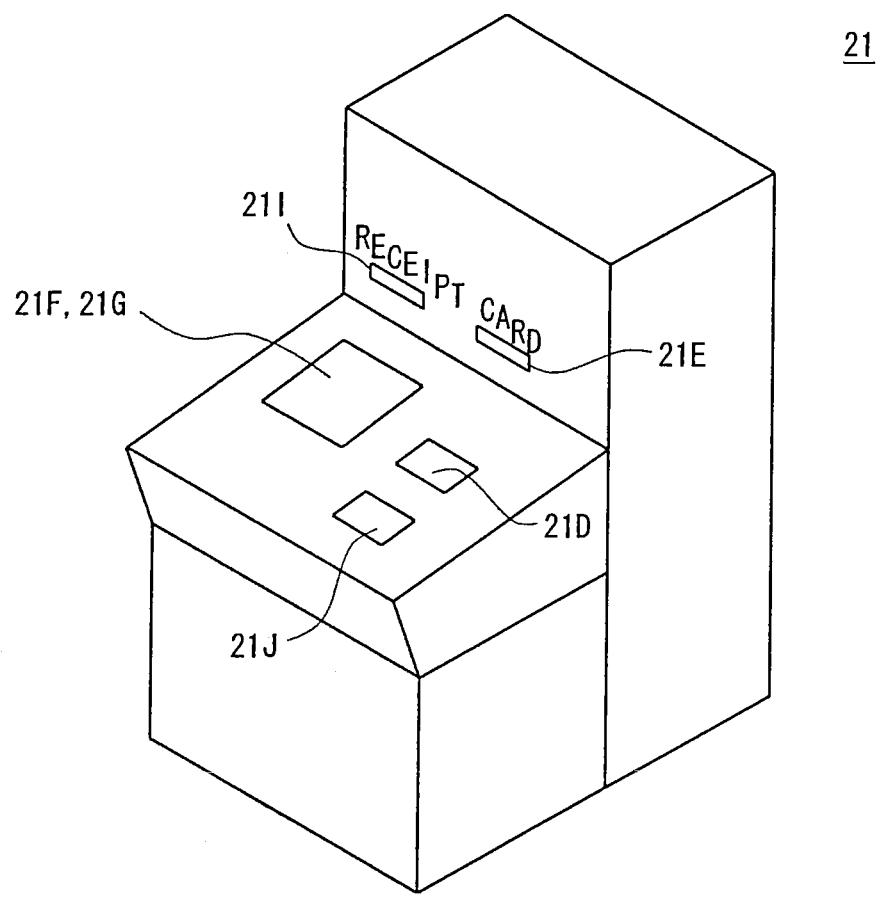
FIG. 8 is a perspective view showing the external appearance of the money-depositing terminal device.

The user who has received such IC card 50 would input the money data of the stated sum of money (electronic money) which substitutes the cash into the IC card 50, employing cash, a cash card, or a credit card, by the use of the money-depositing terminal device 21x shown in FIG. 1. As shown in FIG. 8, the money-depositing terminal device 21x has, on its armor, a card communication part 21D (same configuration as that of the loop antenna 62 and the modulation/demodulation circuit 61) for performing sending/receiving of data to the IC card 50 without touching it, a credit card communication part 21E for reading the data from the magnetic stripes of the cash card and/or the credit card 40, a cash throw-in port 21J, a touch panel wherein a display part 21F and a manipulate part 21G are integrated, and a receipt discharge part 21I for discharging a receipt which is a report of utilization.

As the money-depositing method for inputting the money data (electronic money) in the IC card 50 by the use of the money-depositing terminal device 21x, there are the cash-based depositing method, and the card-based depositing method which is performed by the use of the cash card or the credit card. On the cash-based depositing method, the user throws the cash into the cash throw-in port 21J of the money-depositing terminal device, whereby the money-depositing terminal device 21x writes the money data of the sum of money of the thrown cash in the RAM 58 of the IC Card 50. While, on the card based depositing method, the user inserts the cash card which has been issued by the bank or the credit card which has been issued by the card company into the credit card communication part 21E and then inputs and specifies the desired sum of money via the manipulate part 21G, whereby the money-depositing terminal device 21x transfers the specified money data from the specified account of the cash card or the credit card to the IC card 50. In this connection, a cash card designates a card for utilizing the bank deposits of the bank, while a credit card designates such a card that the credit company (the consumer loan company) which has issued the credit card loans the user the stated money, using the credit card.

Figure 9:
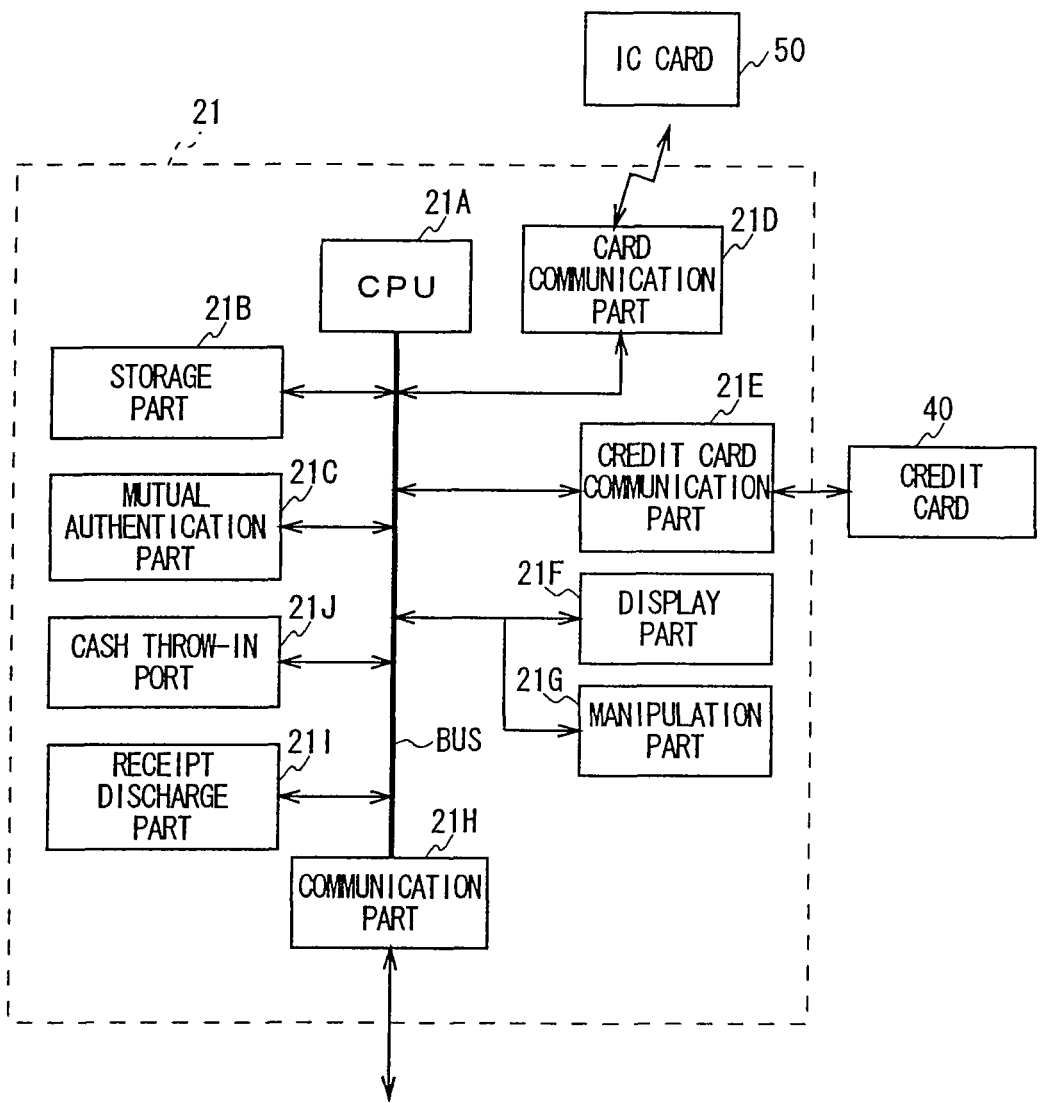
FIG. 9 is a block diagram showing the configuration of the money-depositing terminal device.
Figure 10:
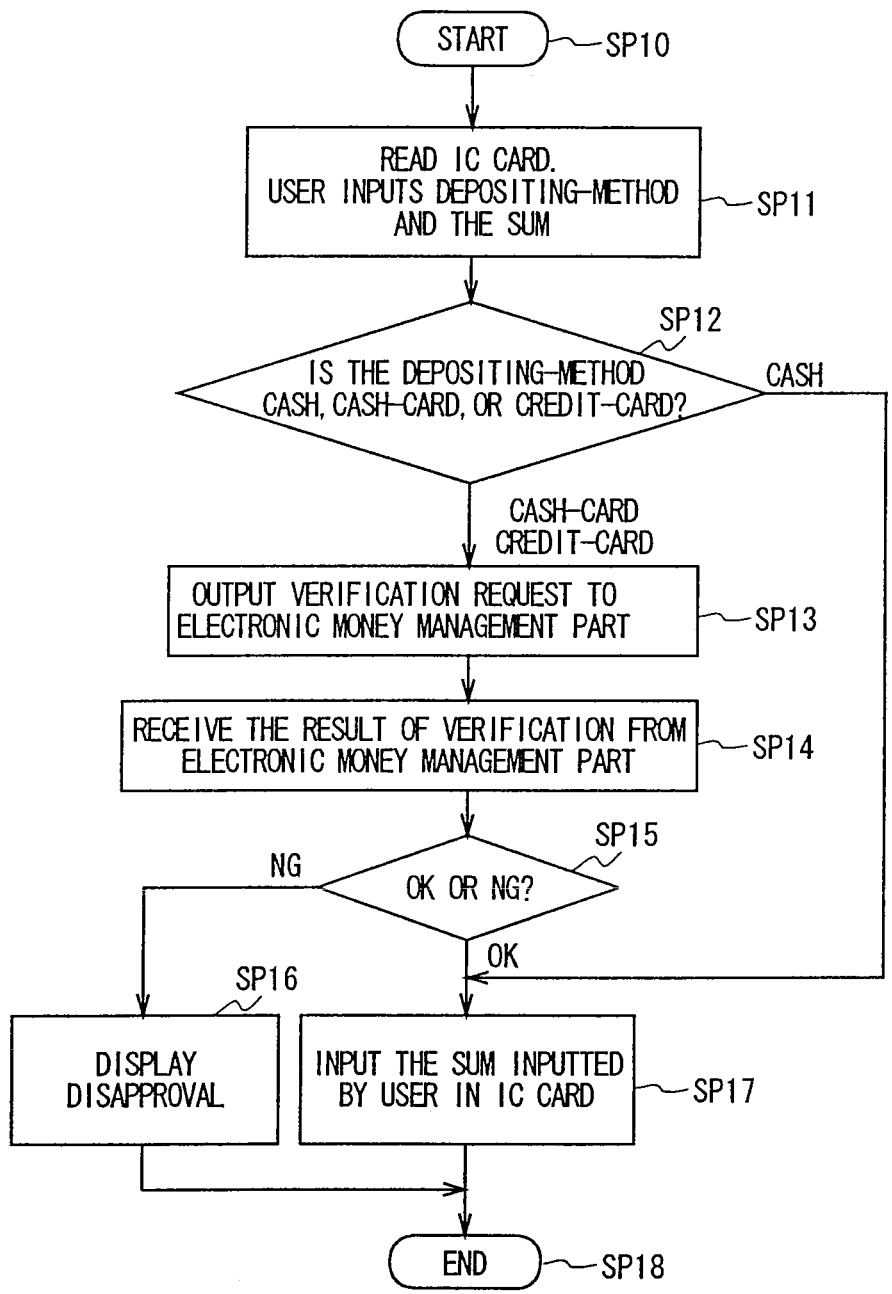
FIG. 10 is a flow chart showing the procedure of money depositing process performed by the money-depositing terminal device.

Referring to FIG. 9, a CPU 21A in the money-depositing terminal device 21x is adapted to executing the money-depositing process shown in FIG. 10, in accordance with the program which is stored in a storage part 21B. When the user has put the IC card 50 near to the card communication part 21D and performed the start-of-depositing manipulation via the manipulate part 21G, the CPU 21A enters the money-depositing process at the step SP10 shown in FIG. 10, then proceeds to the next step SP11 and reads the information such as the card number from the IC card 50, and also waits for the user to input the money-depositing method via the inputting and manipulating part 21G.

Here, if the user has specified the cash-based depositing method, then the CPU 21A makes the cover of the cash throw-in port 21J open, and waits for the user to deposit the cash. When the user has thrown the cash into the cash throw-in port 21J, then the CPU 21A counts the deposited cash.

On the other hand, if the user has specified the card-based depositing method for depositing moneys by the use of the cash card or credit card 40, the CPU 21A inspires the user to insert the cash card or credit card 40, into the credit card communication part 21E by means of displaying on the display part 21, and also inspires the user to manipulate and input the sum of moneys which would be. deposited. So, the user inputs the desired sum of money which is to be deposited, via the manipulation part 21G.

In the case where the money-depositing method which has been specified by the user is the cash-based depositing method, the CPU 21A then proceeds to the step SP17 from the step SP12, and transmits the sum of money of the cash which has been thrown into the cash throw-in port 21J by the user to the IC card 50 via the card communication part 21D, and also transmits the money data of the money which has been inputted on a cash basis to the overall server 16 of the electronic money management part 10 via a communication part 21H, and stores the data therein. Thereupon, the control part 59 of the IC card 50 adds the money data of the sum of deposited money which has been sent from the money-depositing terminal device 21x to the balance of electronic money of the RAM 58, so as to update the balance data D22 (FIG. 7B) which represents the balance of the electronic money account.

On the other hand, in the case where the money-depositing method which has been specified by the user is the method for depositing money by the use of the cash card or credit card 40, the CPU 21A proceeds to the step SP13 from the step S12, and reads out the credit card number from the magnetic stripes of the cash card or credit card 40 which has been inserted into the credit card communication part 21E, and then transmits the credit card number, the password number of the cash card or credit card 40 which has been inputted at this time by the user via the manipulation part 21G, the authorization request for using the cash card or credit card 40, and the sum of money to the electronic money management part 10 (FIG. 1) via the communication part 21H. At this time, a mutual authentication part 21C of the money-depositing terminals device 21x would judge whether the communication partner with whom the CPU 21A is communicating is a normal partner or not.

Then, the electronic money management part 10 transmits the credit card number, the password number of the user inputting, the authorization request for using the cash card or credit card 40, and the sum of money, which have been sent from the money-depositing terminal device 21x, to the management computer 100 of the bank or credit company for managing the cash card or the credit card, via the communication line.

With respect to each cash card and credit card, the management computer 100 of the bank or credit company governs the cash card number and the credit card number as well as the normal password number, and if the combination of the credit card number and the password number inputted by the user which have been transmitted from the electronic money management part 10 coincides with the normal combination, the computer 100 receives the transmitted authorization request for using the credit card.

The management computer 100 of the bank or credit company verifies the balance of the account which has been specified by the cash card number or the credit card number transmitted at this time from the electronic money management part 10, and judges whether using of the card should be allowed or not, on the basis of the information such as the term of the cash card or credit card 40 and the report of loss of the card.

In the case where the sum on money which has been specified at this time remains in the specified account and also the cash card or credit card 40 is usable, the management computer 100 of the bank or credit company approves utilization of the sum of money, and returns the approval for the utilization to the electronic money management part 10, and also transfers the sum of money from the specified account to the overall server 16 of the electronic money management part 10. On the other hand, in the case where the balance of the specified account is less than the specified money, or in the case where the use of the card is not approved on the basis of the information such as the term of the cash card or credit card 40 and the report of loss of the card, the management computer 100 of the bank or credit company does not give the approval for utilization of the sum of money, and returns the effect to the electronic money management part 10.

The electronic money management part 10 transmits the result of the approval judgment to the money-depositing terminal device 21x, so that the CPU 21A of the money-depositing terminal device 21x receives the result of the approval judgment via the communication part 21H, at the step SP14 of FIG. 10.

If the result of the approval judgment is authorization, the CPU 21A proceeds to the step SP17 from the step SP 15, and transmits the sum of money which has been specified by the user to the IC card 50. Thereupon, the control part 50 of the IC card 50 adds the money data of the deposited money which has been transmitted from the money-depositing terminal device 21x to the balance of the electronic money of the RAM 58, thereby updating the balance data D22 (FIG. 7B) which represents the balance of the electronic money account.

The CPU 21A discharges a receipt on which the contents of the trade have been printed from the receipt discharge part 21I, and then ends the money-deposits process at the step SP18.

On the other hand, in the case where the result of the approval judgment which has been received at the step SP14 is disapproval, the CPU 21A proceeds to the step SP16 from the step SP15, and displays the effect that the approval for using the cash card or credit card 40 which has been inserted at this time into the credit card communication part 21E by the user is not given on the display part 21F, and then ends the money-depositing process at the step SP18.

In this way, when the money data of the sum of the user's request (electronic money) has been inputted to the IC card 50 by the use of the cash, the money data of the inputted cash is transmitted and stored into the overall server 16 of the electronic money management part 10 from the money-depositing terminal device 21x; on the other hand, if the money data of the sum of the user's request (electronic money) has been inputted to the IC card 50 by the use of the cash card or credit card 40, then the management computer 100 of the bank or credit company transmits the money data which equals the money data (electronic money) which has been put into the IC card 50 to the electronic money management part 10 from the account which has been specified at this time by the cash card or credit card 40, and stores in the overall server 16.

By this, the overall server 16 of the electronic money management part 10 would retain the moneys data which is equal to the sum of money of the electronic money which has been inputted in the IC card 50 (including the sum of money which has been deposited on a cash basis, as well as the sum of money which has been deposited by the use of the cash card or the credit card).

In this manner, the money data of the sum of the user's request (electronic money) is inputted in the IC card 50, through the various kinds of depositing methods which are based on cash, a cash card, or a credit card. Then, the user is able to buy goods at stores, using the IC card in which the money data has been inputted.

Figure 11:
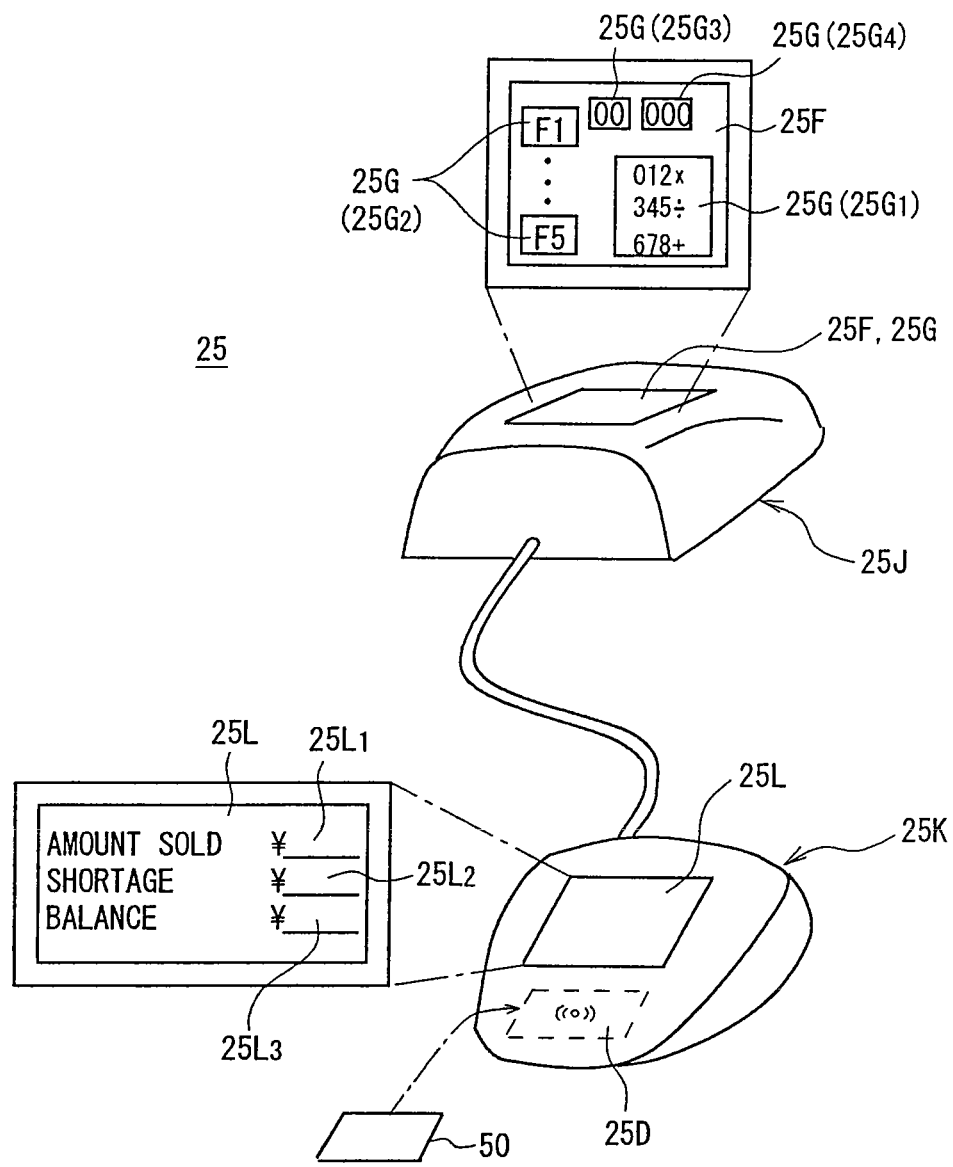
FIG. 11 is a perspective view showing the external appearance of the electronic money terminal device.

An electronic money terminal device 25x (25l to 25n) which is connected to a Pointing On Sale (POS) register, as an example, is equipped in each store. As shown in FIG. 11, the electronic money terminal device 25x includes a main body 25J and an IC card write/read part 25K; a clerk working for a store in which the electronic money terminal device 25x has been equipped would manipulate the main body 25J; the user who intends to utilize the IC card 50 would put the IC card 50 near to the IC card write/read part 25K, so that the IC card write/read part 25K performs sending and receiving of the data related to the utilization to and from the IC card 50, without requiring to touch it.

The armor of the IC card write/read part 25K has the card communication part 25D (same structure as that of the loop antenna 62 and the modulation/demodulation circuit 61) for performing sending and receiving of data to and from the IC card 50 without requiring the IC card to touch the card communication part, and a display part 25L on which the contents of trade are displayed. In the case where the electronic money terminal device 25x is used, if the user has put the IC card 50 over the IC card write/read part 25K of the electronic money terminal device 25x (has brought the IC card 50 near to it), it would be judged that there is the user's will to utilize the IC card 50 (that is, the will for consumption).

The armor of the IC card write/read part 25K has the card communication part 21-a- (same structure as that of the loop antenna 62 and the modulation/demodulation circuit 61) for performing sending and receiving of data to and from the IC card 50 without requiring to touch it, and a display part 25L on which the contents of trade are displayed. In the case where the electronic money terminal device 25, is used, if the user has put the IC card 50 over the IC card write/read part 25K of the electronic money terminal device 25x (has brought the IC card 50 near to it), it would be judged that there is the user's will to utilize the IC card 50 (that is, the will for consumption).

The display part 25L includes an amount sold display part 25L1, a shortage display part 25L2, and a balance display part 25L3. The amount sold which has been inputted by the clerk by means of the manipulation part 25G of the main body 25J is displayed on the amount sold display part 25L1. If the balance of the IC card 50 is insufficient, the shortage is displayed on the shortage display part 25L2. The electronic money balance of the IC card 50 after the utilization of the IC card 50 is displayed on the balance display part 25L3.

Figure 12:
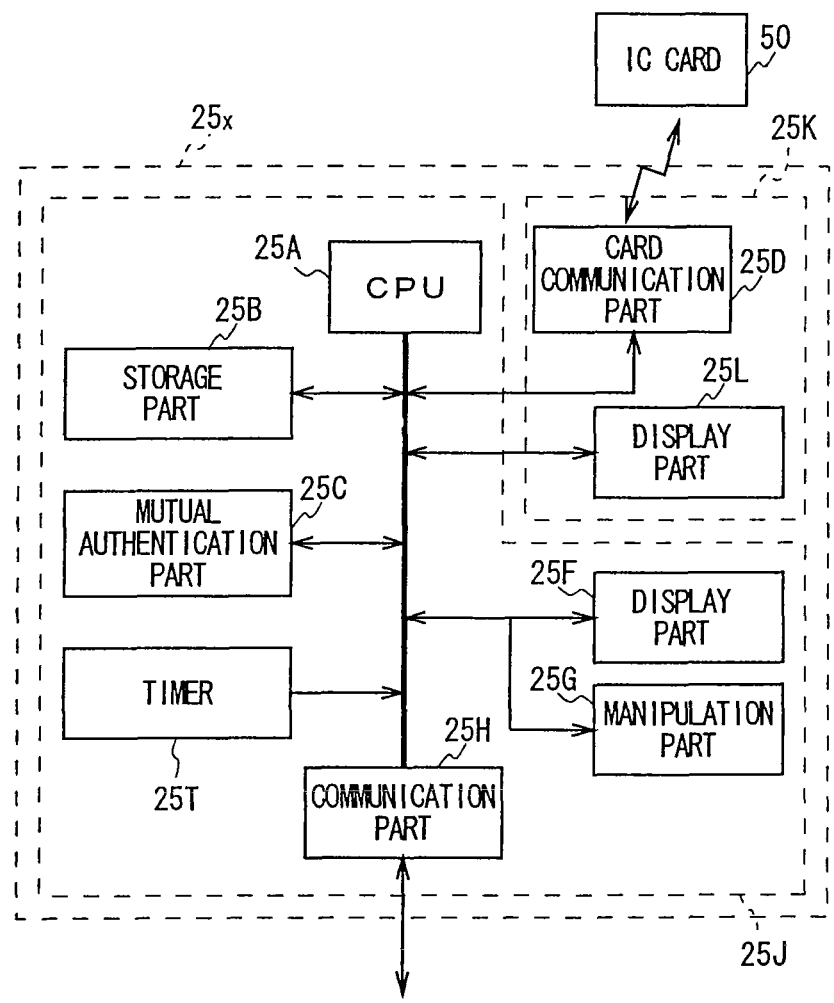
FIG. 12 is a block diagram showing the configuration of the electronic money terminal device.
Figure 13:
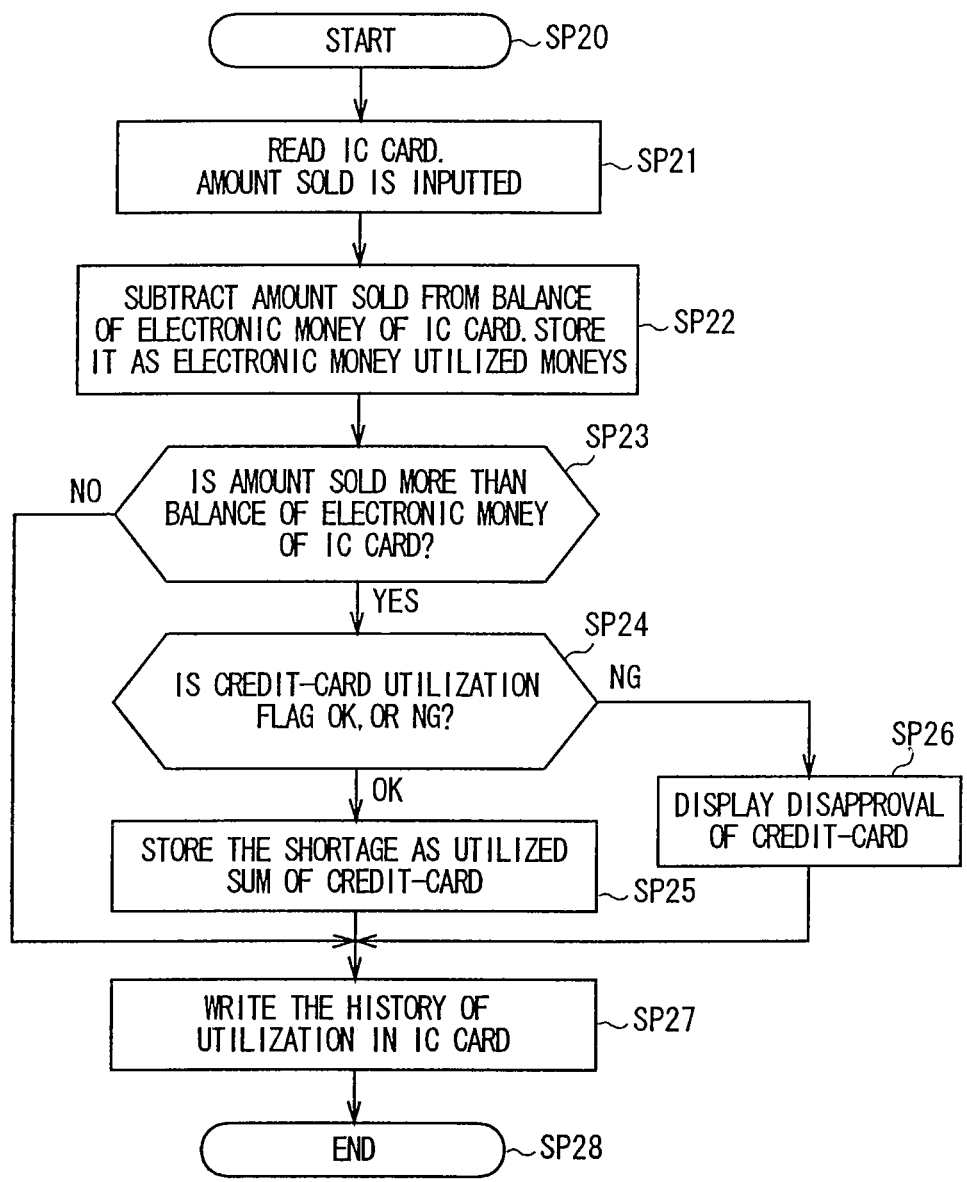
FIG. 13 is a flow chart showing an information-card using procedure of the electronic money terminal device.

Referring now to FIG. 12, a CPU 25A of the electronic money terminal device 25x would execute the IC card utilizing process shown in FIG. 13, in accordance with a program which is stored in a storage part 25B. When the user has put the IC card 50 near to a card communication part 25D of the IC card write/read part 25K and also the clerk has performed the start-of-dealings manipulation by manipulating the manipulation part 25G of the main body 25J, the CPU 25A enters the IC card utilizing procedure at the step SP20 of FIG. 13; then, it proceeds to the following step SP21, and reads the information such as the card number and the history data of the past utilization, which is described hereinafter, from the IC card 50, and also waits for the clerk to input the amount sold via the manipulation part 25G.

When the clerk has inputted the prices of articles via the manipulation part 25G, the CPU 25A proceeds to the following step SP22, and subtracts the amount sold from the balance data D22 (FIG. 7B) which is stored in the RAM 58 of the IC card 50 on the basis of the amount sold, and also stores the electronic money utilized in the electronic money utilized storage area of the storage part 25B of the electronic money terminal device 25*x*, along with the card number of the IC card 50 and the utilized date/time information. In this connection, date/time of utilization is detected by a timer T placed in the main body 25J.

Here, in the case where the sum of money which would be spent is higher than the balance of electronic money which is stored in the IC card 50, the CPU 25A displays on the display part 25F and the shortage display part 25L2, and also proceeds to the step SP24 from the following step SP23, and reads the credit card usable flag (FIG. 7B) stored in the IC card 50, and, if in the usable state, then proceeds to the step SP25 and stores the shortage at this time in the credit card utilized sum storing area of the storage part of the electronic money terminal device 25*x* as the credit card utilized sum.

By this, the sum of money which has been taken in from the balance of the IC card 50 is stored in the storage part 25B of the electronic money terminal device 25*x* as the electronic money utilized information, along with the card number of the IC card 50 and the utilized date/time information, and the money which has been spent as the credit card utilized sum is stored in the storage part 25B of the electronic money terminal device 25*x* as the credit card utilization information, along with the card number of the IC card 50 and the utilized date/time information.

In this connection, when the IC card 50 is distributed to the user, the number of the available credit cards issued by the card company which the user utilizes and the card number of the IC card 50 which is distributed to the user are registered in the issue data server 14 (FIG. 2) of the electronic money management part 10, and also the credit card utilization flag D24 (FIG. 7B) of the RAM 58 of the IC card 50 is held in available state. The electronic money management part 10 frequently verifies by the number of the credit cards, through the card company, whether using of the card is allowed or not, on the basis of the information of the valid term, the loss of the car, the reports of delay and others.

In the case where the registered credit card is unavailable based on the result of the verification, the electronic money management part 10 transmits the card number of the IC card 50 of the user whose registered credit-card number is unavailable, and the information representing that the credit card is unavailable, to each electronic money terminal device 25*x* (25*l* to 25*n*). By this, when the IC card 50 has been used, even if the balance of the electronic money is short, each electronic money terminal device 25 (25*l* to 25*n*) do not allocate it for credit-card's utilization, and displays the effect that the balance is short on the display parts 25F and 25L, and also sets the credit card available flag of the memory of the IC card 50 to unavailable.

If the credit card available flag which has been set at the memory of the IC card 50 is changed to unavailable, then each electronic money terminal device 25*x* (25*l* to 25*n*) would treat only spending of the electronic money which has been previously deposited in the IC card 50. In this case, the CPU 25A of the electronic money terminal device 25 therefore moves from the step SP24 of FIG. 13 to the step SP26, and displays the effect that the credit card is unavailable on the display parts 25F and 25L.

When a series of treatment related to utilization of the IC card 50 has been completed, the CPU 25A of the electronic money terminal device 25, proceeds to the step SP27, writes the history of the utilization at this time in the RAM 58 of the IC card 50 as the electronic money log data D23 (FIG. 7B), and then ends the IC card using procedure at the step SP28.

As a result of this, in the storage part 25B of the electronic money terminal device 25*x*, the utilized money based on the electronic money which has been previously stored in the IC card 50 and also the credit-card-utilized money which has been transferred by the utilization of the credit card at the time when the IC card was short of the electronic money are separately stored, as the utilization-history related to the utilization of the IC card 50. In this connection, at this time, the date/time of the utilization and the IC card number are stored in the storage part 25B, along with the utilized sum of money, as the utilization-history information.

The utilization-history block includes the communication assignment information D231, the log type information D232, the utilized date/time information D233, the terminal number information D234, the dealing (utilization) money information D235 in the utilization-history, the key version information D236, the balance information D238, and the signature information D239. The communication assignment information D231 is used for assigning the communication of the time of the utilization which is written in the block with the IC card 50. The log type information D232 represents the usage pattern of the electronic money in the utilization history (the usage patter of depositing, spending, etc., and classification of whether the spending has been done utilizing the balance of the electronic money or the shortage has been transferred to the utilization of the credit card). The terminal number information D234 represents the number of the electronic money terminal device 25*x* which has been used. The key version information D236 represents the version of the encipherment key of the communication data of the time when the IC card is utilized. The balance information D237 represents the electronic-money balance in the IC card after the dealing (utilization). In the communication between the electronic money terminal device 25*x* assigns the communication by the use of the communication assignment information D238. The signature information D239 is represented using the key which has been specified with the above-mentioned key version information D236.

In this way, the control part 59 of the IC card 50 is adapted to forming each utilization into the electronic money log data D23 which is comprised of one utilization-history block (FIG. 14A). As to the utilization unit in this case, the utilization based on the electronic money which has been previously stored in the IC card 50 and the utilization which has been transferred to the credit-card-basis-utilization at the time when the electronic money was short are treated as the separate units (utilization history), and these individual units form the separate utilization-history blocks.

The electronic money log data D23 which is made in this way for each utilization of the IC card 50 is written in the RAM 58 of the IC card 50 at the step SP28 of the IC card utilizing procedure which has been described hereinbefore in relation to FIG. 13, and also accumulated in the storage part 25B of the electronic money terminal device 25x at the step SP22 and the step SP25 which have been described hereinbefore in relation to FIG. 13.

In this case, the CPU 25A of the electronic money terminal device 25x adds a card assignment information D23A for assigning the IC card 50 shown in FIG. 14B to the electronic money log data D23 (FIG. 14A), and writes them in the storage part 25B.

That is, the card assignment information D23A includes an IC card identification number D23A1, a terminal transaction flag D23A2, a key version information D23A3, and a signature information D23A4. The IC card identification number D23A1 represents the IC card which has been utilized in the electronic money log data D23 to which the card assignment information D23A has been added. The terminal transaction flag D23A2 represents whether the electronic money terminal device 25x which writes the electronic money log data D23 at this time is identical to the electronic money terminal device 25x of the time of card utilization when the electronic money log data D23 has been made or not. The key version information D23A3 represents the version of the encipherment key of the communication data of the time when the electronic money log data D23 is written in the electronic money terminal device 25x. The signature information D23A4 is represented using the key which has been specified with the key version information D23A3.

In this connection, the CPU 25A of the electronic money terminal device 25x writes the electronic money log data D23 in the RAM 58 of the IC card 50 at the time of card utilization when the electronic money log data D23 has been made, and besides adds the card assignment information D23A to the electronic money log data D23 and writes in the storage part 25B of the electronic money terminal device 25x. The electronic money log data D23 which have been written in the IC card 50 are accumulated in the IC card 50 for the past fifteen times of utilization; for each new utilization of the IC card 50, such electronic money log data D23 is written in the electronic money terminal device 25x on which the IC card 50 has been utilized, along with the card assignment information D23A.

In this way, each time the IC card 50 is utilized, the electronic money terminal device 25x writes the electronic money log data D23 of past fifteen times of utilization which have been written in the IC card 50 in the storage part 25B, and if the terminal number information D234 of the written past electronic money log data D23 is the information which represents the other electronic money terminal device 25x, then, on the basis of the terminal transaction flag D23A2 of the card assignment information D23A, it is displayed that the electronic money log data D23 is representing the dealing which has been performed by means of the other electronic money terminal device 25x. And, this display is used at the time when the electronic money management part 10 settles the accounts.

Figure 15:
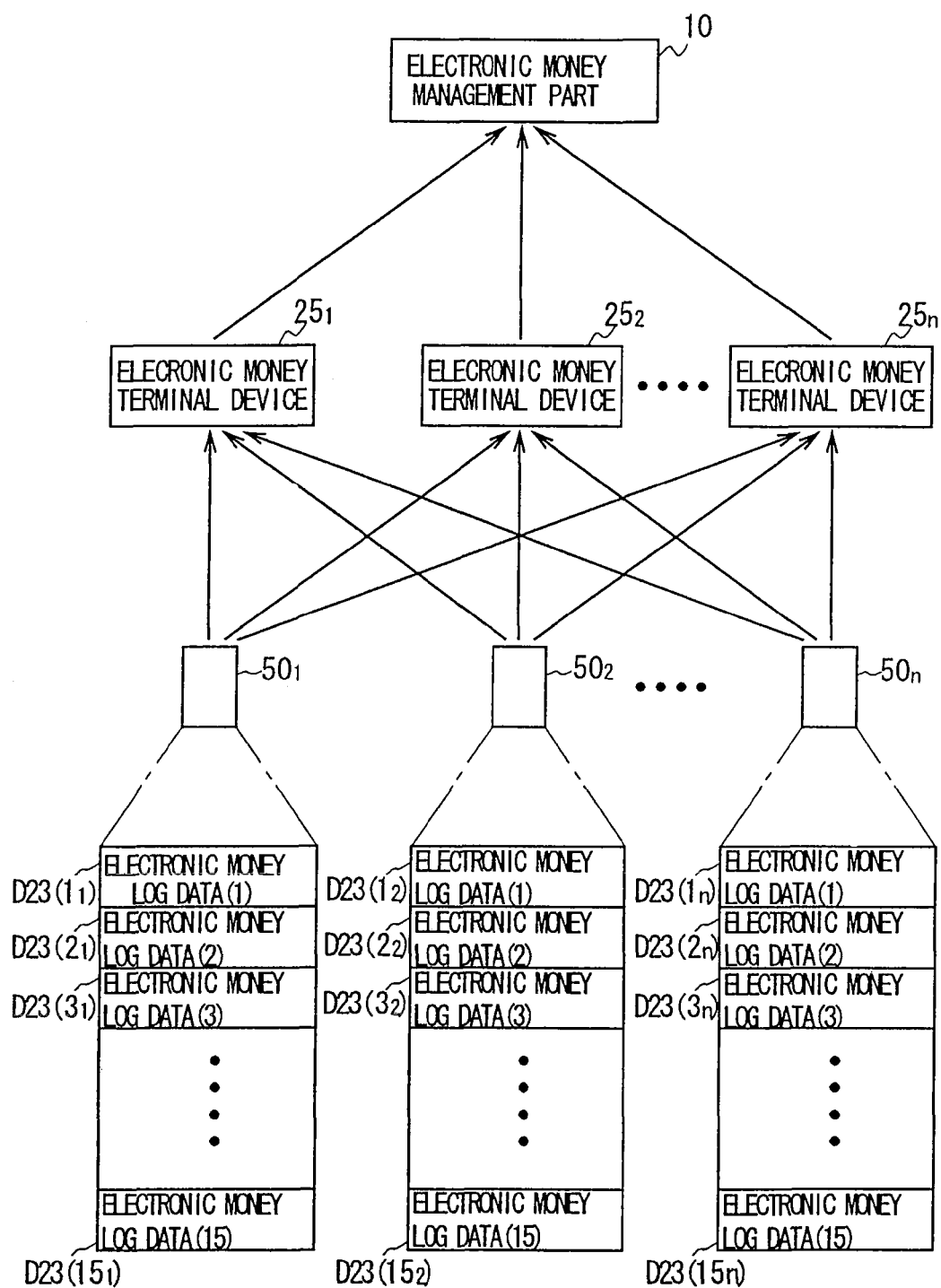
FIG. 15 is a schematic block diagram showing the flow of the electronic money log data.

In this connection, as shown in FIG. 15, at the time when the IC cards 50 (501, 502 . . . 50n) are used, the respective electronic money log data D23(11) to D23(151), D23(12) to D23(152), D23(10 to D23(15n) of the past fifteen times of utilization which are accumulated in each of the IC cards 50 (501, 502, . . . 50n) are written in the electronic money terminal devices 25x every time; therefore, if the same IC card 50 has been used plural times toward the same electronic money terminal device 25x then such a case may occur that the same electronic money log data D23 are written in the electronic money terminal device 25x; however, in this case, the CPU 25A of the electronic money terminal device 25x discards the duplicate electronic money log data D23, on the basis of the communication assignment information (Card Transaction S/N (A)) D231 of the electronic money log data D23 shown in FIG. 14.

By this, in one electronic money terminal device 25x, the electronic money log data D23 of the past fifteen times of utilization which have been read from these IC cards 50 (501 502, . . . 50n) at the time when the IC cards 50 (501, 502, . . . 50n) have been used and the new electronic money log data D23 which has occurred at the time of the use are stored, without duplication.

In this state, in plural electronic money terminal devices 25x (251, 252, . . . 25n), the same electronic money log data D23 of each IC card 50 (501, 502, . . . 50n) are stored. However, on the electronic money log data D23 which is stored in the electronic money terminal device 25x which has been used at the time of the dealing when the electronic money log data D23 has occurred (the time when the IC card has been utilized) out of the same electronic money log data D23 which have been distributively stored in these every electronic money terminal devices 25x, the dealing terminal flag (Terminal Transaction Flag) D23A2 (FIG. 14B) of the card assignment information D23A (FIG. 14B) which are stored along with the electronic money log data D23 is set, so that only the electronic money log data D23 on which the dealing terminal flag has been set out of the electronic money log data D23 which have been gathered to the electronic money management part 10 is used at the time of the settlement of the account.

In this way, the information of the sum of money, the card number, and the date/time is accumulated in the electronic money terminal device 25x as the utilization history each time the IC card 50 is used; the electronic money management part 10 captures the utilization histories of the IC card 50 which have been accumulated in the respective electronic money terminal devices 25x, (25l to 25n) once a day, collectively.

The electronic money management part 10 gathers the credit-card utilization information out of the IC-card utilization-history information (the electronic money log data D23 and the card assignment information D23A) which have been captured from the respective electronic money terminal devices 25x (25l to 25n) and coordinates them for each IC card 50 and for each stated term, and then transmits the result of the coordination to the management computer 100 of the bank or credit company along with the card number of the IC card, on the basis of the previously registered credit-card number.

At this time, the management computer 100 of the bank or credit company withdraws the sum of money which has been transferred to the utilization of the credit card from the user's account, and transmits the effect to the electronic money management part 10 so as to accumulate in the overall server 16.

Therefore, the sum of money which have been accumulated as the credit-card-utilized money because of a shortage of electronic money at the time when the user utilizes the IC card 50 is collectively withdrawn from the user's account with the management computer 100 of the bank or credit company, and stored in the overall server 16 of the electronic money management part 10.

In this way, even though the shortage of the electronic money balance of the time when the user uses the IC card has been transferred to the utilization of the credit card, the withdraw processing toward the management computer 100 of the bank or credit company is not performed at once, and the withdrawal is performed at a later time collectively; so that it is able to request the management computer 100 of the bank or credit company to withdraw the sum of money of the plural times of utilization, with one time of communication from the electronic money management part 10. In this way, the communication cost do not occur for each time of utilization of the. IC card, so that it is able to utilize the IC card 50 (credit card) even if the utilized money is a small sum.

The electronic money management part 10 performs the settlement of the accounts, one time per month as an example, on the basis of the utilization history of the IC card 50 (the electronic money log data D23 and the card assignment information D23A) which have been captured from the respective terminal devices 25 (25*l* to 25*n*) into the database 16C of the overall server 16 one time per day, collectively.

Figure 16:
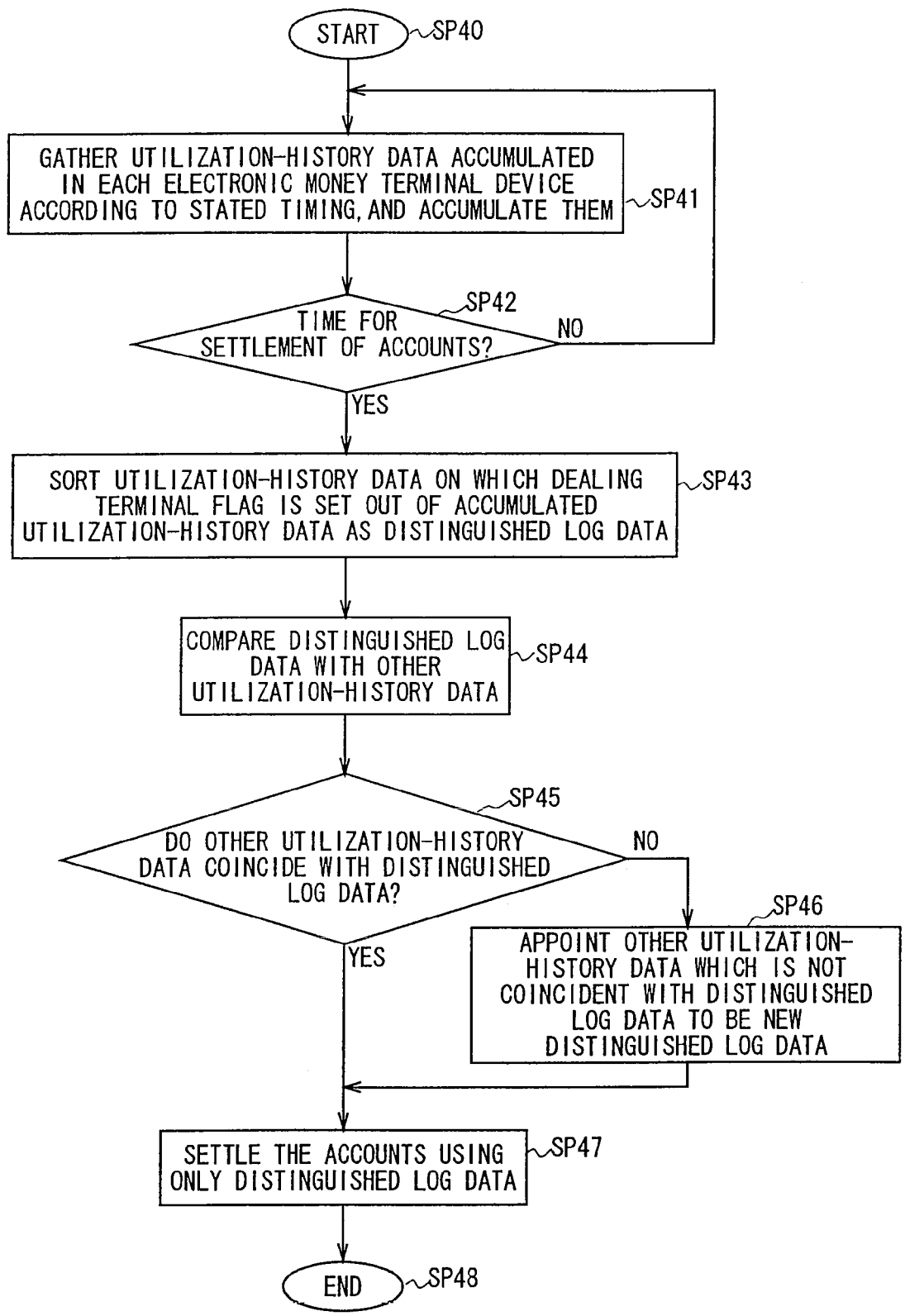
FIG. 16 is a flow chart showing the procedure of log data distinguishing.

FIG. 16 shows the procedure for settling the account; wherein the electronic money server 13 of the electronic money management part 10 gathers the data (utilization history) which is the combination of the electronic money log data D23 (FIG. 14A) and the card assignment information D23A (FIG. 14B) to the overall server 16 from each electronic money terminal device 25*x* at a stated period (one time per day, as an example), and then performs the settlement of the account by the use of the utilization history accumulated in the overall server 16; upon entering the procedure from the step SP40, the electronic money server 13 gathers the utilization history which have been accumulated in the electronic money terminal devices 25*x* from these electronic money terminal devices 25*x*, with a frequency of one time per day as an example, and stores in the overall server 16, at the following step SP41.

At the step SP42, the electronic money server 13 judges whether it is the time of the settlement of account which is to be performed with a frequency of one time per day as an example or not, and if it is the time of the settlement, proceeds to the step SP43 and distinguishes the utilization history data on which the dealing terminal flag (Terminal Transaction Flag) D23A 2 has been set out of the utilization histories which have been accumulated in the overall server 16 as the distinguished log data.

The electronic money server 13 proceeds to the following step SP44, and compares the distinguished log data with the other utilization-history data. If the result of this comparison is mismatch, this effect is representing that the electronic money log data D23, which has occurred at the time when the IC card has been used, has been lost in any of the electronic money terminal devices 25*x*, then the electronic money server 13 obtains the negative response at the step SP45, and proceeds to the step SP46.

At the step SP46, the electronic money server 13 appoints the other utilization-history data which is not coincident with the distinguished log data to be the distinguished log data. this way, the electronic money log data D23 which has been read from the IC card 50 in the other electronic money terminal device 25*x* at the time when the IC card 50 has been utilized substitutes the lost electronic money log data D23.

Then, the electronic money server 13 performs the settlement of the accounts using only the distinguished log data at the step SP47, and then ends the procedure at the step SP48.

Figure 17:
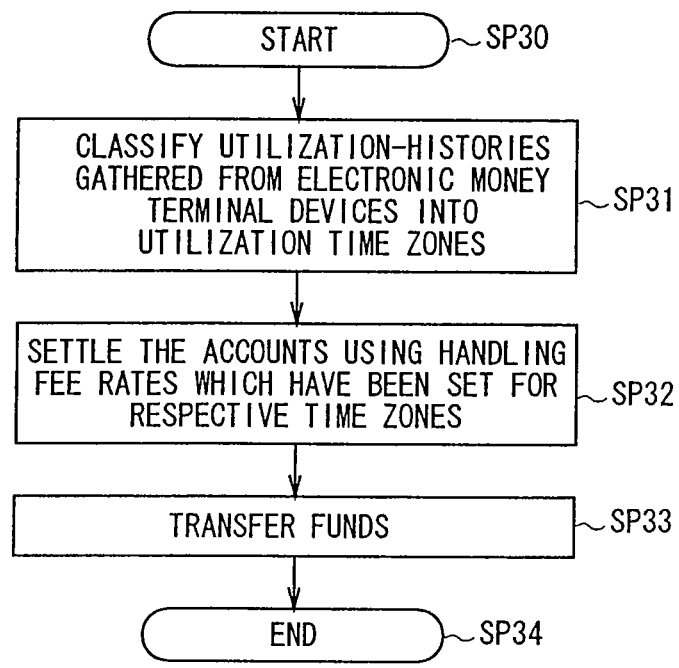
FIG. 17 is a flow chart showing the procedure of the settlement of accounts which is performed by the electronic money management part.

At here, the electronic money server 13 enters the settlement steps of FIG. 17 in accordance with the process start command sent from the overall server 16, that is, it enters the settlement procedure from the step SP30 shown in FIG. 17, and then, at the following step SP31, classifies the utilization histories (the electronic money log data D23 and the card assignment information D23A) which have been gathered from the electronic money terminal device into the utilized time zones, on the basis of the utilized date/time information D233 (FIG. 14A). In this connection, in the database 16C of the overall server 16, the utilizing fee of the electronic money system 1 for each store is previously stored, and the handling-fee-rates toward the amount sold are set as the different values for the respective time zones, as the utilizing fees. In the case of this embodiment, if the time when the IC card 50 is utilized is between 5:00 a.m. to 5:00 p.m. (the first time zone) then the handling fee is set to 5% and if between 5:00 p.m. to 5:00 a.m. (the second time zone) then the handling fee is set to 7%.

Therefore, the electronic money server 13 performs the settlement of the accounts with respect to the electronic money log data D23 which have been classified into the firs time zone and the second time zone at the step SP31 of FIG. 15, by the use of the handling-fee-rates for the respective time zones, at the following step SP32.

So, the electronic money server 13 performs the settlement of the accounts, using the handling-fee-rate of 5% toward the utilized sum of money which has been utilized at the first time zone, and using the handling-fee-rate of 7% toward the utilized sum of money which has been utilized at the second time zone.

Therefore, the utilizing fee of 5% of the utilized sum of money which has been utilized during the first time zone is subtracted therefrom, and the utilizing fee of 7% of the utilized sum of money which has been utilized during the second time zone is subtracted therefrom, and the returns are thus brought to each store. Upon performing the settlement of the account in this way, the electronic money server 13 proceeds to the following step SP33, and takes out the sum of the returns which accords with the result of the settlement of the account from the moneys data which has been accumulated in the database 16C of the overall server 16, and pays the sum into each store's account. At this time, the electronic money server 13 outputs the data of the detailed report of the respective time zones and the total report of the respective time zones with respect to every utilization, as the detailed payment report for each store, and then distributes the data to the respective stores.

Then, the electronic money server 13 ends the settlement of the account at the step SP34.

In this way, by applying the different handling-fee-rates of electronic-money utilization for the respective time zones, and by setting the lower handling fee during the daytime at which most sales are of commodities of comparatively small amount, and setting the higher handling fee during the night at which most sales are of commodities of comparatively large amount, it is able to realize the handling-fee-rates which accord with the price-setting of commodities in each store.

(2) Operation and Effects of the Embodiment

In the above configuration, in the electronic money system 1, when plural users use the respective IC cards 50 (501, 502, . . . 50*n*), the electronic money log data D23 of the past fifteen times of utilization is accumulated in the respective IC cards 50 (501, 502, . . . 50*n*). Each time a new electronic money log data D23 has occurred, the oldest electronic money log data D23 is discarded, in regular order. Hence, in the IC card 50, the electronic money log data D23 of the newest fifteen times of utilization would be accumulated.

When the user uses the IC card 50, all electronic money log data D23 of the past fifteen times of utilization which have been stored in the IC card 50 are accumulated in the storage part 25B of the electronic money terminal devices 25*x*. Hence, the histories of the utilization which have been treated on any of the electronic money terminal devices 25*x* are accumulated.

Therefore, in plural electronic money terminal devices 25*x*, the respectively identical electronic money log data D23 would exist. However, to the electronic money log data D23 which has occurred at the time of current utilization of the IC card 50, the dealing terminal flag D23A2 is set, and the data D23 is accumulated in the electronic money terminal device 25x which has been used at the time of the current dealing.

The electronic money management part 10 gathers the utilization-history data, which are the combination of the electronic money log data D23 and the card assignment-information D23A and which have been accumulated in the respective electronic money terminal devices 25x, from the respective devices 25x, and then performs the settlement of account. At this time, in the-utilization-history data which have been gathered from the respective electronic money terminal devices 25x, the identical data exist (however, there are the data on which the dealing terminal flag D23A2 is set, and the data on which the flag D23A2 is not set).

Out of these utilization-history data, only the data on which the dealing terminal flag D23A2 is set is distinguished, so that the utilization-history data which are obtained from the electronic money terminal device 25x which has been practically used for the dealing are gathered. At this time, if any electronic money terminal device 25x loses the utilization-history data accumulated therein, then it is needed to substitute the identical electronic money log data D23 which has been accumulated in the other electronic money terminal device 25x for the data on which the dealing terminal flag D23A2 is set in the lost utilization-history data. So, at the time when the settlement of accounts is performed in the electronic money management part 10, the distinguished log data on which the dealing terminal flag is set is compared with the other utilization-history data on which the dealing terminal flag is not set; if it is deemed that the distinguished log data has been lost (if the result of the comparison is a mismatch), it is able to substitute the other utilization-history data for the (lost) distinguished log data.

So, at the time when the settlement of accounts is performed in the electronic money management part 10, the distinguished log data on which the dealing terminal flag is set is compared with the other utilization-history data on which the dealing terminal flag is not set; if it is deemed that the distinguished log data has been lost (if the result of the comparison is mismatch), it is able to substitute the other utilization-history data for the (lost) distinguished log data.

Owing to the fact that the identical electronic money log data D23 are stored in plural electronic money terminal devices 25x, even though any electronic money log data D23 has been lost, it is able to use the electronic money log data D23 which has been stored in the other electronic money terminal device 25x instead. In this way, the plural number of the identical utilization-history data representing the respective dealing contents are accumulated, so that, even if the dealing has been performed off-line without communicating with the electronic money management part 10 at the time of utilization of the IC card 50 on each electronic money terminal device 25x, it is able to perform the settlement of accounts surely, avoiding loss of the utilization-history data.

According to the above configuration, the identical utilization-history data are accumulated in plural electronic money terminal devices 25x, so that, even if any trouble has occurred in one electronic money terminal device 25x, it is able to use the utilization-history data which has been stored in the other electronic money terminal device 25x, in this way, it is able to gather the utilization-history data in the electronic money management part 10 surely.

(3) The Other Embodiment

In the above-mentioned embodiment, such a case has been described that the dealing terminal flag D23A2 is added to the utilization history, and then this is coordinated in the electronic money management part 10. However, the present invention is not limited to this, but at the time of the settlement of accounts which would be performed in the electronic money management part 10, the respective contents of the utilization histories (electronic money log data D23) can be compared with each other, and then the settlement of accounts can be performed such that the electronic money log data D23 which have coincided with each other on the comparison are treated as one utilization history, alternatively. Besides, in the above-mentioned embodiment, the non-contact type IC card 50 has been used. However, the present invention is not limited to this, but a contact type IC card can be used, alternatively.

Further, in the above-mentioned embodiment, such a case has been described that the utilization histories have been gathered employing the dealing terminal flag D23A2 and coordinated. However, the present invention is not limited to this, but as an example, the electronic money management part 10 keeps governing the electronic money terminal devices 25x, and if any of the electronic money terminal devices 25x has trouble, the history of the utilization which has been dealt in the troubled electronic money terminal device 25x is found out of the utilization histories which have been gathered from the other electronic money terminal devices 25x and used for the settlement of accounts. In this case, the utilization history which is related to the time when the troubled electronic money terminal device 25x has treated the utilization can be distinguished on the basis of the terminal number information D234 (FIG. 14A) which has been described in the utilization history (the electronic money log data D23).

Further, in the above-mentioned embodiment, such a case has been described that the electronic money management part 10 captures the utilization histories of the IC card 50 which have been accumulated in the electronic money terminal devices 25x one time per day collectively, and the electronic money management part 10 performs the settlement of accounts one time per month. However, with respect to the timing for capturing the utilization history from each electronic money terminal device 25x and the timing for performing the settlement of accounts, various timing can be applied to.

Further, in the above-mentioned embodiment, such a case has been described that the utilization histories of the past fifteen times is stored in the IC card 50. However, the present invention is not limited to this, but the other various times of utilization histories can be stored instead.

A As stated above, according to the present invention, in an electronic money system that includes plural electronic money terminal means for withdrawing money data of a sum of money which is spent by a user from money data of a sum of money which has been deposited into an information card and that withdraws the money data of the spent money from the information card are read out at the time when the money data of the money spent is withdrawn from the information card, and the respective utilization-history data which are covering plural times of utilization and which are read out by the respective ones of the plural electronic money terminal means are gathered and coordinated, so that it is able to surely coordinate and tabulate the utilization histories of the information card which has been utilized on the plural electronic money terminal means.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of operating an electronic money system including an information device, a money depositing terminal, a plurality of electronic money terminal devices, and an electronic money management unit, the method comprising:
the money depositing terminal depositing electronic money on the information device;
performing a plurality of withdrawals from the electronic money deposited on the information device at the electronic money terminal devices;
the information device storing a plurality of pieces of electronic money log data, wherein each piece of electronic money log data is related to a respective withdrawal;
each of the electronic money terminal devices storing a plurality of pieces of utilization-history data including at least one piece of utilization-history data related to a withdrawal that utilized another electronic money terminal device, each piece of utilization-history data including:
(a) a piece of electronic money log data related to a respective withdrawal, and
(b) a flag corresponding to the piece of electronic money log data, the flag indicating whether the respective electronic money terminal device was utilized during the withdrawal related to the piece of electronic money log data;
causing the electronic money management unit to:
(a) gather the plurality of pieces of utilization-history data, including the pieces of electronic money log data and corresponding flags, from the electronic money terminal devices, wherein the at least one piece of utilization-history data related to the withdrawal that utilized the another electronic money terminal device is gathered from an electronic money terminal other than the another electronic money terminal,
(b) designate some pieces of electronic money log data as distinguished log data based on the corresponding flags, and
(c) perform settlement using the distinguished log data.

2. The method of claim 1, wherein the electronic money management unit designates a piece of electronic money log data as distinguished log data if the corresponding flag indicates the respective electronic money terminal device was utilized during the withdrawal related to the piece of electronic money log data.

3. The method of claim 2, wherein the electronic money management unit designates a piece of electronic money log data as other log data if the corresponding flag indicates the respective electronic money terminal device was not utilized during the withdrawal related to the piece of electronic money log data.

4. The method of claim 3, wherein the electronic money management unit compares the distinguished log data with the other log data before performing settlement.

5. The method of claim 4, wherein if a piece of other log data does not correspond to any piece of distinguished log data, the electronic money management unit designates the non-corresponding piece of other log data as distinguished log data to be used for settlement.

6. The method of claim 5, wherein the piece of other log data corresponds to a piece of distinguished log data if the piece of other log data and the piece of distinguished log data include an identical piece of electronic money log data.

7. The method of claim 2, wherein the electronic money management unit performs settlement using only the electronic money log data designated as the distinguished log data, and does not use the electronic money log data designated as the other log data for settlement.

8. The method of claim 1, wherein said information device transmits and receives the electronic money.

9. The method of claim 1, wherein a first electronic money terminal is connected to a first Point of Sale register, and a second electronic money terminal is connected to a second Point of Sale register.

10. The information device of claim 9, wherein the information device is an IC card.

11. The method of claim 1, wherein a piece of electronic money log data stored in a respective electronic money terminal device and included in the at least one piece of utilization-history data related to the withdrawal that utilized the other electronic money terminal device is read from the information processing device.

12. An electronic money system comprising:
an information device configured to store electronic money;
a plurality of electronic money terminals configured to receive payment;
an electronic money management unit;
at least one processor; and
at least one memory device which stores instructions, which when executed by the at least one processor, cause the at least one processor to:
cause the money depositing terminal to deposit electronic money on the information device;
perform a plurality of withdrawals from the electronic money deposited on the information device at the electronic money terminal devices;
cause the information device to store a plurality of pieces of electronic money log data, wherein each piece of electronic money log data is related to a respective withdrawal;
cause each of the electronic money terminal devices to store a plurality of pieces of utilization-history data including at least one piece of utilization-history data related to a withdrawal that utilized another electronic money terminal device, each piece of utilization-history data including:
(a) a piece of electronic money log data related to a respective withdrawal, and
(b) a flag corresponding to the piece of electronic money log data, the flag indicating whether the respective electronic money terminal device was utilized during the withdrawal related to the piece of electronic money log data;
cause the electronic money management unit to:
(a) gather the plurality of pieces of utilization-history data, including the pieces of electronic money log data and corresponding flags, from the electronic money terminal devices, wherein the at least one piece of utilization-history data related to the withdrawal that utilized the another electronic money terminal device is gathered from an electronic money terminal other than the another electronic money terminal,
(b) designate some pieces of electronic money log data as distinguished log data based on the corresponding flags, and (c) perform settlement using the distinguished log data.

13. An information device comprising:

a processor; and a memory device storing a plurality of instructions, which when executed by the processor, causes the processor to:
- (a) store electronic money;
- (b) store a plurality of pieces of past electronic money log data, wherein each piece of past electronic money log data is related to a respective past withdrawal of electronic money from a respective electronic money terminal device;
- (c) during a current withdrawal of electronic money by an electronic money terminal device, transfer the pieces of past electronic money log data to the electronic money terminal device making the current withdrawal including at least one piece of past electronic money log data related to a withdrawal that utilized another electronic money terminal device, the at least one piece of past electronic money log data being transferred for transmittal to a electronic money management unit for settlement; and
- (d) store a piece of new electronic money log data related to the current withdrawal.

\* \* \* \* \*